United States Patent
Rothi

[15] 3,662,837
[45] May 16, 1972

[54] SOD SEVERING AND ROLL FORMING APPARATUS

[72] Inventor: Raymond C. Rothi, St. Paul, Minn.
[73] Assignee: Outboard Marine Corporation, Waukegan, Ill.
[22] Filed: Feb. 10, 1969
[21] Appl. No.: 797,972

[52] U.S. Cl. ............................................. 172/20, 172/101
[51] Int. Cl. .......................................................... A01b 45/04
[58] Field of Search ..................... 172/19, 20, 21, 22, 101, 85

[56] References Cited

UNITED STATES PATENTS

| | | | |
|---|---|---|---|
| 1,230,320 | 6/1917 | Payne | 172/19 |
| 2,682,824 | 7/1954 | Bowser et al. | 172/19 |
| 2,872,989 | 2/1959 | Hadfield | 172/20 |
| 3,164,211 | 1/1965 | Scott | 172/19 |
| 3,387,666 | 6/1968 | Hadfield | 172/20 |

Primary Examiner—Robert E. Pulfrey
Assistant Examiner—Stephen C. Pellegrino
Attorney—Robert E. Clemency, John W. Michael, Gerrit D. Foster, Bayard H. Michael, Paul R. Puerner, Joseph A. Gemignani, Andrew O. Riteris, Spencer B. Michael and Robert K. Gerling

[57] ABSTRACT

A sod severing and rolling apparatus having a reciprocating knife for severing the sod at predetermined intervals and a set of prongs for lifting the end of the severed sod vertically upward and a rack for forming the start of a sod roll.

10 Claims, 12 Drawing Figures

INVENTOR
RAYMOND C. ROTHI

SOD SEVERING AND ROLL FORMING APPARATUS

BACKGROUND OF THE INVENTION

1. Field of the Invention.

This invention relates generally to sod harvesting equipment and, more specifically, to sod severing and sod rolling apparatus.

2. Description of the Prior Art.

There are various prior art machines available for severing and rolling sod in a single operation. One of these prior art machines employs a reciprocating knife that both cuts and starts the sod roll. In this prior art machine, the knife first severs the sod into a strip on the down stroke and then the forward motion of the knife in the sod severing machine frictionally engages the end of the strip of sod to initiate the start of a sod roll. A typical device of this type is shown in Hadfield U.S. Pat. No. 3,387,666. The knife, while pivotally mounted in the Hadfield device is restrained from substantial pivotal motion about its pivotal support so as to produce frictional engagement between the severed sod strip and the knife. By restraining the knife from substantial pivoting or moving backward in the sod harvesting machine as the machine moves forward, the knife bulldozes or forces the end of the strip of sod in front of the knife to form into a roll. After the roll has been initiated or started by the knife, the knife is brought upward and a rack located behind the knife continues the task of rolling the sod strip.

Initially, those types of machines appeared to operate satisfactorily. However, prolonged operation of these types of machines produced complaints from users as the reciprocating mechanism that slidably supported the knife tended to wear excessively. The excessive wear produced frequent breakdown of the machines in field use. This excessive wear was caused by the knife being restrained from substantial pivotal motion as the sod harvesting machine moved forward. As the knife remains substantially vertical so as to bulldoze the sod to force the sod into a roll, as the machine moves forward, it produces very high lateral forces or torques on the reciprocating knife mechanism. These forces produce very rapid wear on the reciprocating knife support mechanism. This is understandable as the knife and machine move forward at speeds of 150–200 feet per minute. When the knife engages the sod, the knife momentarily comes to a stop until the force on the strip of sod is large enough to force the sod upward to initiate a sod roll. In prior art sod severing devices that did not cut and form the sod into a roll in a single operation, the knife was allowed to pivot backward so as not to produce these excessive lateral forces on the knife. In fact, one of the objectives in building sod cutting machines was to eliminate the lateral force on the knife as the sod cutting machine moved forward. This was achieved by developing a pivotal mounting for the reciprocating knife so as to allow the knife to swing freely backward as the machine moved forward, thus eliminating the lateral forces that produced wear on the knife holding mechanism. In order to make a combination sod cutting and roll forming apparatus, the knife was restrained from laterally backward motion by a roller. This caused the knife to bulldoze the edge of the sod into a roll whereby a subsequent rack could continue to form the sod into a roll.

The excessive wear is not the only disadvantage of having a knife blade that bulldozes the sod strip. In addition, the bulldozing engagement of the sod by the knife produced a jolt or shock to the machine. With a sulky attached to the sod harvesting apparatus, this jolt or shock was transmitted to the rider each time the knife engaged the turf to start a new roll. If the soil is relatively hard when the sod is being harvested, these jolts are quite severe and, consequently, quite annoying to the operator. Thus, not only do these prior art cutting and rolling devices that employ a blade to cut and bulldoze the sod into a roll produce excessive wear of the machine but they also annoy the operator as he receives a jolt every time the knife starts to form a new sod roll.

The present invention eliminates the excessive wear on the knife mechanism and the jolt to the operator by allowing the knife to rotate freely about a pivot point on the machine as in the past. The unrestrained motion of the knife eliminates jolts and wear to the machine as it is identical to previously used sod severing machines, which did not wear rapidly or give the operator a jolt. To form the sod into a roll, in the sod cutting machine a set of prongs or tines are provided to engage or lift the end of the sod slightly upward to allow a rack located rearward of the prongs to form the sod into a roll. In the present invention these prongs are shown attached to the arm that drives the knife but it will be apparent to those skilled in the art that they need not be as it is only necessary to lift the sod so as to allow a rack to engage and force the end of the sod into a roll.

SUMMARY OF THE INVENTION

Briefly, the invention comprises a set of suitably located prongs arranged for lifting the severed end of a strip of sod and a rack for engaging the end of the strip of sod to form the sod into a roll.

More specifically, a principal object of the invention is the provision of an apparatus for cutting and forming a roll of sod in response to forward movement thereof, which apparatus comprises means on the frame and connected to a knife for reciprocating the knife transversely of the strip so as to sever the sod strip into predetermined lengths, a set of prongs arranged, at least in part, at an acute angle to the vertical for lifting the end of the severed sod, means on said frame and connected to the prongs for reciprocating the prongs in timed relation to the knife reciprocation so as to lift the end of the severed sod length as the knife retracts subsequent to severing the sod strip, and means on the frame for engaging the lifted end of the sod strip so as to partially form the sod into a roll.

Other objects and advantages will become known by the following description, the accompanying drawings, and the claims.

DESCRIPTION OF THE PREFERRED EMBODIMENT

Figure 1:
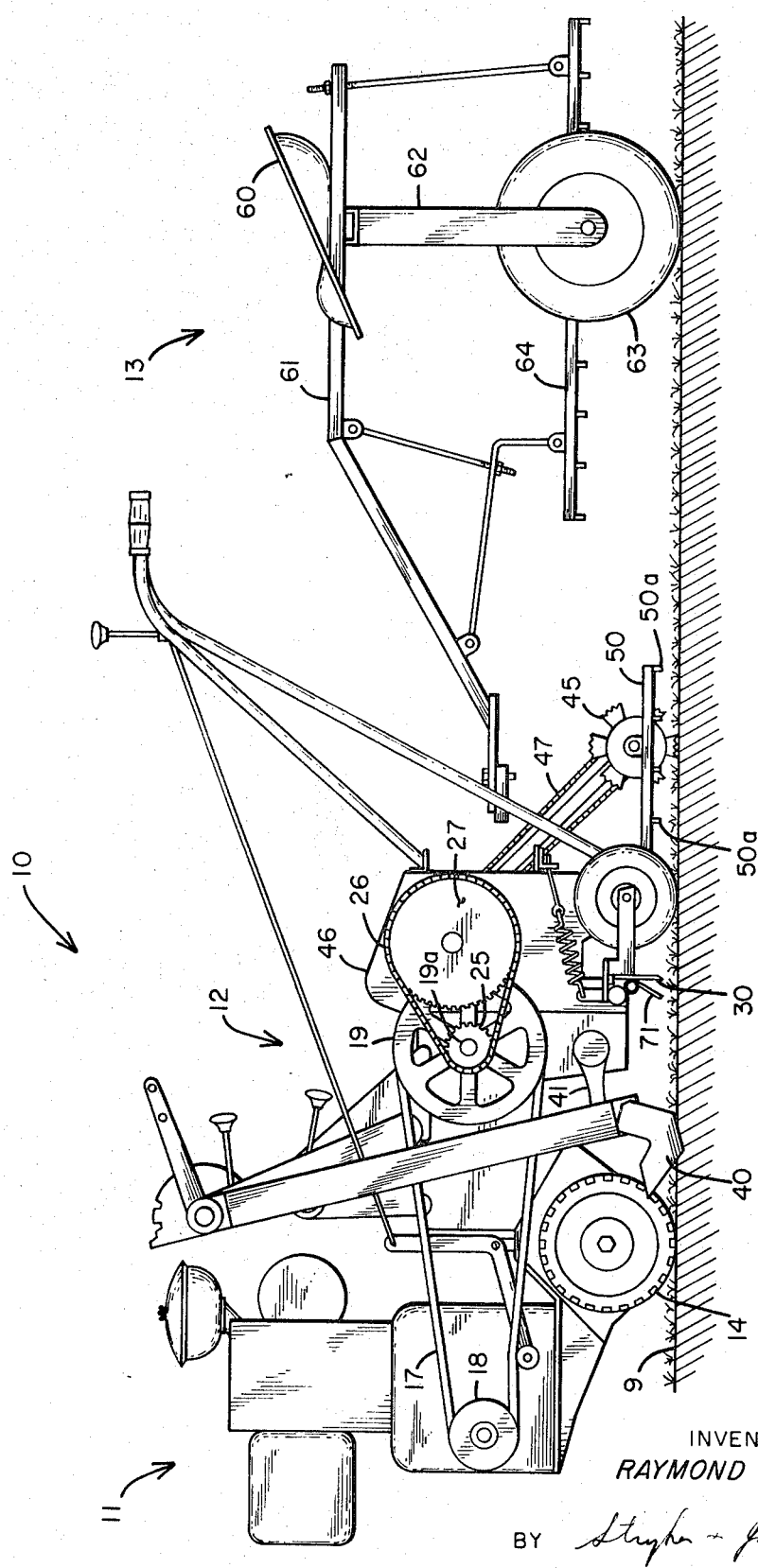
FIG. 1 shows a side view of the sod cutting and roll forming apparatus.

Referring to FIG. 1, reference character 10 generally designates a self propelled sod cutting and rolling machine comprising a gasoline engine 11, a sod severing and rolling machine 12 and a riding sulky 13. Sod severing and rolling machine 12 contains a grooved drive wheel 14 that is powered from engine 11 through drive pulley 18, drive belt 17, drive wheel 19 and a suitable drive mechanism (not shown). Shaft 19a of drive wheel 19 contains a sprocket wheel 25 that powers a cycle clutch mechanism (not shown) which drives a sod severing knife 30 through a drive chain 26 and a second sprocket wheel 27. The cycle clutch mechanism may be of the type shown in Kindlien et al U.S. Pat. No. 3,061,059 and will not be described herein. Located on the underside and front of sod severing and rolling apparatus 12 is an oscillating sod severing knife 40 that slices the sod in continuous lengths along a plane parallel to the horizontal. A drive arm 41 powers oscillating knife 40 backward and forward producing the cutting action to slice the sod into continuous lengths.

Located at the rear of sod severing apparatus 12 is a metering wheel 45 that connects to clutch housing 46 through a drive chain 47. Metering wheel 45 rotates counterclockwise as the machine moves forward and after predetermined intervals trips a member in clutch housing 46 which allows knife 30, located underneath sod severing apparatus 12, to sever the sod in predetermined lengths. Located adjacent to metering wheel 45 and toward the rear of apparatus 12 is a roll starting and forming rack 50. Rack 50 comprises a series of downward extending spikes 50a that are spaced across the machine for engaging the lifted end of the sod to begin to form the roll.

Located to the rear of machine 10 is a riding sulky 13 comprising a seat 60 for an operator to sit thereon. Seat 60 is mounted on a frame 61 which is supported through a support bracket 62 which is journaled to first wheel 63 and a second wheel (not shown). Located beneath frame 61 and attached thereto is a second rack 64 that is similar to rack 50. Rack 64 engages the top of the started roll of sod and continues to roll the strip of sod into a neat, compact roll that is readily transportable.

Figure 2:
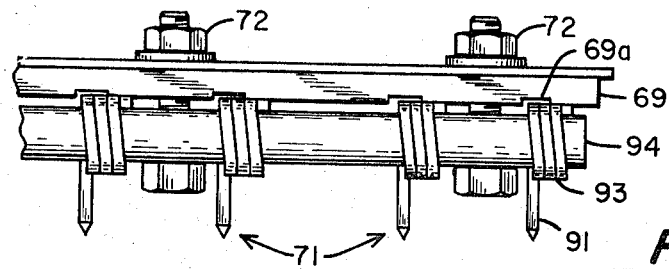
FIG. 2 shows a partial top view of the sod lifting prongs of the present invention.
Figure 3:
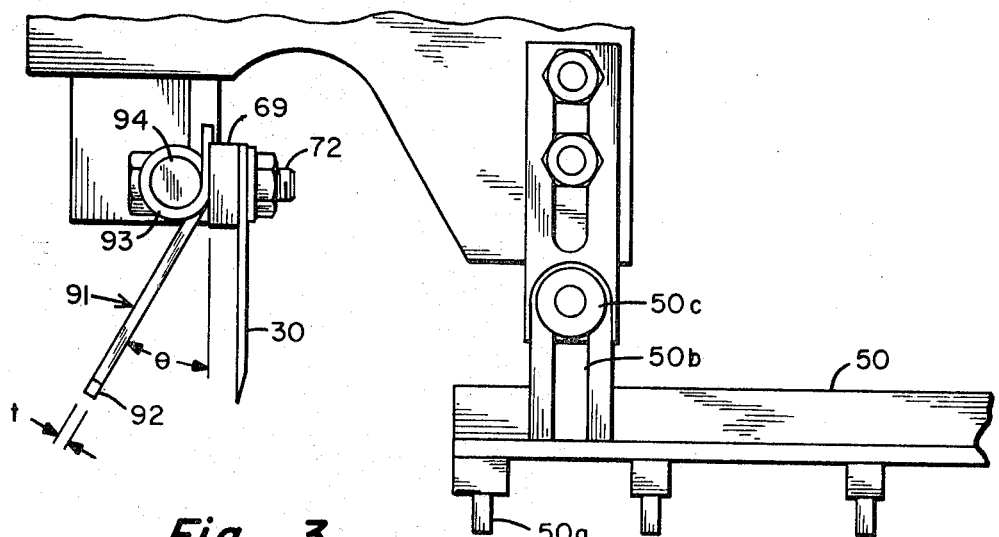
FIG. 3 shows a partial side view of the sod lifting prongs and the roll forming apparatus.
Figure 4:
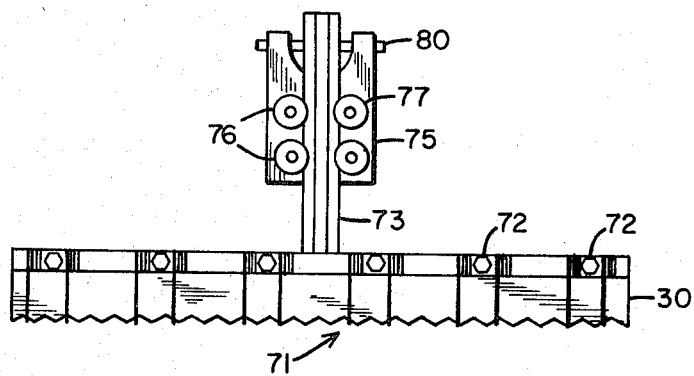
FIG. 4 shows a front view of the sod lifting prongs mounted on a displaceable cross arm support.

FIGS. 2, 3 and 4 show in greater detail knife 30 for severing the sod in predetermined lengths. Knife 30 mounts on a cross arm support 69 through a set of bolts 72. Attached to cross arm support 69 is an upward extending drive arm 73 that is slidably mounted in a way plate 75 by a first set of rollers 76 and a second set of rollers 77. Rollers 76 and 77 coact to restrain arm 73 from lateral motion while still allowing drive arm 73 to move freely upward or downward between rollers 76 and rollers 77. Way plate 75 is pivotally mounted in housing 46 through a hinge pin 80. Hinge pin 80 allows way plate 75, arm 73 and knife 30 to swing backward as machine 10 advances forward.

The pivotal mounting of way plate 75 prevents knife 30 from moving forward with the machine in a bulldozing fashion. It was this sudden bulldozing action by the knife that produced a jolt to the person riding the sulky and precipitated rapid wear on rollers 76 and rollers 77. The foregoing constitutes a description of the prior art sod cutting machine made and distributed by the Ryan Equipment Company.

The novelty in this sod machine is a set of springs 71 that lift the end of the strip of sod upward to allow rack 50 to form the sod into a roll. If blade 30 is allowed to freely pivot on hinge 80, as in prior art sod cutting machines, it only severs the sod at predetermined intervals and obviously does not bulldoze the sod so as to initiate or form sod 9 into a roll.

In order to provide the dual function of cutting and rolling, there is provided a set of prongs 71 that lift the end of the severed sod upward so that the forward motion of machine 10 causes rack 50 to turn over the end of the uplifted sod thereby beginning to form a sod roll. Hereinafter, the set of prongs is referred to by reference numeral 71 and an individual prong is referred to by reference numeral 91. As all the sod lifting prongs in set 71 are identical, only one sod lifting prong will be described in detail.

Prong 91 has a square cross-sectional area with a wedge shaped tip 92 for penetrating or piercing into sod 9. Typically, the thickness of sod lifting prong is five thirty-seconds of an inch. However, this is given by way of illustration and no limitation is intended thereto. Prong 91 contains a coiled section 93 that fits loosely over prong holding rod 94 which attaches to cross arm support 69 through the aforementioned bolts 72. One coil on the coiled spring is held in pressure contact between prong holding rod 94 and cross arm 69 to prevent prong 91 from slipping or rotating off prong holding rod 94. Note, there is a recessed area 69a in cross arm support 69 that prevents the entire coiled section 93 of prong 91 from being held tightly against cross arm support 69. This allows coiled section 93 to flex thus producing a greater amount of resiliency in prong 91 than if prong 91 were only a straight section without a coil. This resiliency provided by coiled section 93 prevents prong 91 from breaking if a hard object should be struck. Coiled section 93 also distributes the forces over a greater area and thus prevents prong 91 from unduly flexing at any particular point to thereby cause work hardening and eventual failure of prong 91. This is important as these prongs must intermittently engage the soil thousands of times during the harvesting of a sod field. If breakage should occur, the operator would have to continually replace the prongs which would soon become a nuisance.

Referring to FIG. 3, note that prong 91 is located at an angle $\theta$ from the vertical. Preferably this angle $\theta$ is on the order of 30°, however, this is by way of illustration and no limitation is intended thereto. If prongs 71 are vertical they will not grasp the end of the sod strip and lift it upward so that the forward drive motion of machine 10 and rack 50 can form the sod into a roll. Consequently, it is necessary to have the prongs located at an acute angle to the vertical as shown in FIG. 3. In FIG. 3 prongs 71 are shown located on cross arm support 69 that also supports knife 30. When prongs 71 are mounted on the same cross arm as knife 30, special precaution must be taken to prevent the sod from plugging up between the knife and sod. If the angle or the distance between prongs 91 and knife 30 is too small, it causes the sod to tear loose from the strip and to plug the area between the prongs and the blade. This prevents prongs 71 from lifting the sod upward so that the forward moving rack 50 can form the sod into a roll.

While it is envisioned that other sizes and shapes of sod lifting members could be used with the invention, the multiple prong or finger type of arrangement is preferred because it damages the sod very little as the prongs pierce the sod without cutting or ruining the end of the sod.

In operation, prongs 71 act like a fork as they lift the end of the sod strip upward. As prongs 71 continue to move further upward the weight of the sod strip and the pivotal motion of prongs 71 cause the sod to slip off prongs 71. As the sod slips off prongs 71, the front row of teeth on rack 50 moves forward to engage or catch the lifted end of the sod before the sod can fall back to its original position. As rack 50 engages the end of the sod strip, the forward motion of machine 10 begins to form the sod into a roll. As the roll increases in diameter, rack 50 is displaced vertically upward along elongated slot 50b located around a shoulder bolt 50c. This vertical displaceability of rack 50 prevents the sod roll from binding or tearing under rack 50 as machine 10 moves forward.

Referring to FIGS. 5–9, the operation and coaction of sod lifting prongs 71 and sod rolling rack 50 will be described in greater detail. In FIGS. 5–9 only the reciprocating knife 30, prongs 71 and roll forming rack 50 are shown. This is for purposes of illustrating how knife 30 severs the sod at predetermined lengths, how prongs 71 lift the end of the sod upward and how rack 50 forms the sod into a roll. While knife 30 is shown mounted on the same cross arm as prongs 71, it is not necessary that they are mounted to the same reciprocating mechanism as it is coaction between the sod lifting prongs 71 and the rack 50 that provide the sod rolling function. Thus, it is envisioned that sod lifting prongs 71 can be separately mounted to lift the sod upward. However, the preferred method is to use the same arm for both the sod knife and the sod lifting prongs as the unit is less costly to build if the prongs can be operably mounted on an already existing member in sod cutting machine 10.

Figure 5:
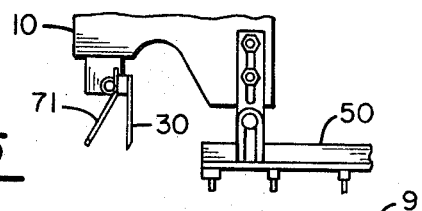
FIGS. 5 to 9 show the various positions of the knife, the sod lifting prongs and the rack during the sod lifting and the roll forming operation of the machine.
Figure 6:
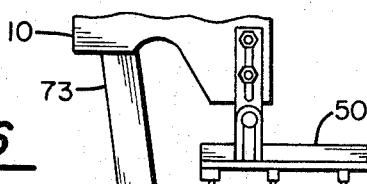

FIG. 5 shows knife 30 and a set of sod lifting prongs 71 in a pre-sod cutting position. In this pre-sod cutting position, neither knife 30, nor prongs 71, nor rack 50 are in engagement with sod 9. As machine 10 moves forward or to the left in the drawing, the cycle clutch mechanism in clutch housing 46 drives knife 30 and prongs 71 into sod 9. Knife 30 severs sod 9 into predetermined lengths suitable for forming a sod roll while prongs 71 pierce the soil preparatory to lifting the sod end upward. Referring to FIG. 6, knife 30 and prongs 71 are shown in the downward extended position with knife 30 at its lower most cutting position. In this position, sod strip 9 has been freed from engagement of the turf in both a horizontal and vertical plane and is in a position suitable for forming a sod roll. Note, member 73 is at a slight rearward angle. This indicates that machine 10 has continued forward while the forward motion of blade 30 has been momentarily stopped by the end of sod strip 9. As knife blade 30 and prongs 71 are mounted on pivotally mounted way plate 75, the pivotal motion of way plate 75 through hinge 80 prevents any force from being transmitted to arm 73 and consequently any force from being transmitted to the operator riding on sulky 13.

Figure 7:
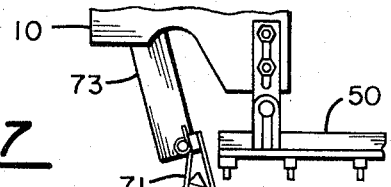

FIG. 7 shows prongs 71 lifting the end of the sod upward as both prongs 71 and knife 30 move rearward and upward. Note, arm 73 is substantially pivoted on hinge 80 (not shown) and that as long as arm 73 is allowed to swing freely rearward, as shown, knife 30 does not transmit any force or jar to arm 73 that would cause excessive wear on way plate rollers 76 and 77 (FIG. 4). Also the rider on sulky 13 does not receive a jolt as long as knife 30 can move freely.

Figure 8:
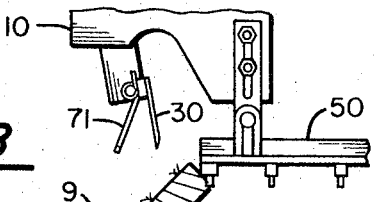

FIG. 8 shows arm 73, knife 30 and prongs 71 in the partially upward retracted position immediately after sod 9 has slipped from prongs 71. Because of the forward motion of the machine, the front row of spikes on rack 50 engage the lifted end of sod 9 before it can fall back to its original position. As machine 10 continues its forward motion, rack 50 turns over the upward lifted end of sod 9 thus forming the end of sod 9 into a roll.

Figure 9:
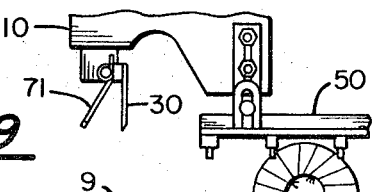

FIG. 9 shows sod severing knife 30 and prongs 71 in the retracted position as machine 10 continues to move forward and at the same time continues to roll the entire strip. As the roll becomes larger, rack 50 moves upward along slotted members 50b to compensate for the increased diameter of the roll. After the sod roll has been started rack 50 and a following rack 64 (FIG. 1) continues to form the sod into a roll until a rolled strip of sod emerges from the rear of sulky 13.

From the foregoing illustrations it will be apparent that the mechanism shown and described provides the combination of a sod rolling unit and a sod severing unit in one machine without producing jolts to a rider or producing excessive wear on the way plates of a sod severing machine. This has been achieved by lifting the edge of sod 9 with prongs 71 so that the sod rolling process can be performed by a rack 50.

Figure 7A:
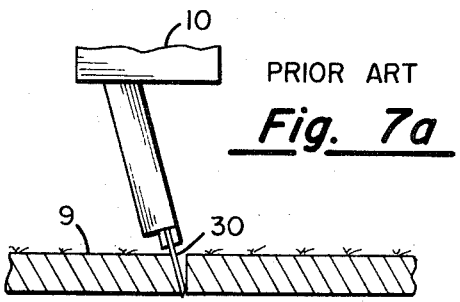
FIGS. 7A, 8A and 9A show the prior art steps of cutting the sod without the sod lifting prongs to illustrate the difference in operation of the prior art machine with and without the sod lifting prongs.
Figure 8A:
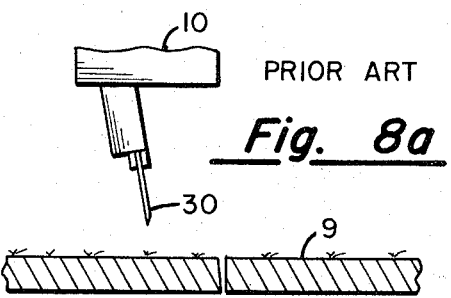
Figure 9A:
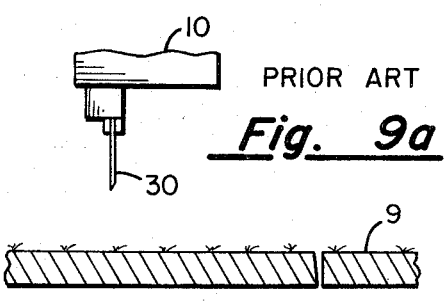

In order to better appreciate the action and operation of sod lifting prongs, FIGS. 7A, 8A and 9A have been included to show a pivotal mounted knife 30 in the same position corresponding respectively to FIGS. 7, 8 and 9. FIG. 7A shows the sod strip after it has been severed by knife 30. Knife 30 has moved upward and rearward but it has not lifted the end of the sod upward.

FIG. 8A shows knife 30 after it has been freed from sod strip 9. Note, the end of the sod strip remains flat and has not been lifted upward by knife 30.

FIG. 9A shows knife 30 in the retracted position which is a comparable position to the knife position shown in FIG. 9. Note, however, that in the operation of the rearward swinging knife 30, as illustrated in FIGS. 7A, 8A and 9A, the end of the sod strip is not lifted upward but remains flat.

I claim:

1. An apparatus for cutting and forming a roll of sod in response to forward movement thereof, said apparatus comprising: a frame, means on said frame for severing a continuous length of sod into a strip; a knife for severing the sod strip into predetermined lengths; means on said frame and connected to said knife for reciprocating said knife transversely of the strip so as to sever said sod strip in predetermined lengths; a set of prongs arranged, at least in part, at an acute angle to the vertical for lifting the end of the severed sod; means on said frame and connected to said prongs for reciprocating said prongs in timed relation to said knife reciprocation so as to lift the end of the severed sod length as said knife retracts subsequent to severing the sod strip; and means on said frame for engaging the lifted end of the sod strip so as to partially form the sod into a roll.

2. Apparatus in accordance with claim 1 wherein said prongs include a coiled section to provide greater flexibility.

3. Apparatus in accordance with claim 1 wherein said set of prongs includes a plurality of transversely aligned prongs.

4. Apparatus in accordance with claim 2 including a member mounted on said knife for holding said prongs.

5. Apparatus in accordance with claim 3 wherein said prongs are mounted at an angle of approximately 30° to the vertical.

6. Apparatus in accordance with claim 3 wherein said means for engaging the lifted end of the sod includes a spike tooth rack.

7. In a forwardly moving sod freeing and rolling machine: a frame; means operable in response to vertical reciprocation for providing a sod strip with at least one free end; means on said frame for vertically reciprocating said sod strip free end providing means; means extending, at least in part, at an acute angle to the vertical and operable in response to vertical reciprocation for piercing and lifting the free end of the strip of sod; means on said frame for vertically reciprocating said sod strip piercing and lifting means; and further means on said frame for engaging the free end of the strip as the machine moves forwardly to begin forming the free end of sod into a roll.

8. A machine in accordance with claim 7 wherein said sod strip piercing and lifting means includes a plurality of prongs for piercing engagement with the strip of sod to afford lifting of the free end of the strip of sod upwardly in response to upward movement of said plurality of prongs.

9. In a forwardly moving sod freeing and rolling machine: a frame; means on said frame operable in response to reciprocation for freeing a surface strip of sod so that the sod strip has at least one free end; means on said frame for reciprocating said sod strip freeing means; second means including a plurality of prongs extending, at least in part, at an acute angle to the vertical and mounted to said sod strip freeing means for engaging and lifting the free end of the strip of sod; and further means on said frame for engaging the free end of the strip as the machine moves forward to begin forming the free end of sod into a roll.

10. A machine in accordance with claim 9 wherein said further means for engaging the free end of the sod strip includes a rack having a plurality of downwardly projecting members that engage and turn over the free end of the lifted sod to partially form the sod into a roll in response to machine movement.

* * * * *